(12) United States Patent
Lautier et al.

(10) Patent No.: US 8,116,280 B2
(45) Date of Patent: Feb. 14, 2012

(54) METHOD FOR MANAGING COMMUNICATIONS AND RELATED CORE NETWORK NODE

(75) Inventors: Laurence Lautier, Plaisir (FR); Terry Bush, Parker, TX (US)

(73) Assignee: Kapsch Carriercom France S.A.S., Paris (FR)

( * ) Notice: Subject to any disclaimer, the term of this patent is extended or adjusted under 35 U.S.C. 154(b) by 992 days.

(21) Appl. No.: 12/088,488

(22) PCT Filed: Sep. 25, 2006

(86) PCT No.: PCT/IB2006/002642
§ 371 (c)(1),
(2), (4) Date: Mar. 28, 2008

(87) PCT Pub. No.: WO2007/036780
PCT Pub. Date: Apr. 5, 2007

(65) Prior Publication Data
US 2008/0220783 A1 Sep. 11, 2008

(30) Foreign Application Priority Data
Sep. 29, 2005 (EP) ..................... 05292031

(51) Int. Cl.
*H04W 4/00* (2009.01)
(52) U.S. Cl. ...................................... 370/331
(58) Field of Classification Search .................. 370/331
See application file for complete search history.

(56) References Cited

U.S. PATENT DOCUMENTS

| | | | | |
|---|---|---|---|---|
| 6,738,625 | B1 * | 5/2004 | Oom et al. | 455/453 |
| 7,054,629 | B2 * | 5/2006 | Turina et al. | 455/432.1 |
| 7,346,023 | B2 * | 3/2008 | Chuah | 370/328 |
| 7,729,702 | B2 * | 6/2010 | Rinne et al. | 455/442 |
| 7,792,078 | B2 * | 9/2010 | Haumont et al. | 370/331 |
| 7,860,510 | B2 * | 12/2010 | Kroth et al. | 455/453 |

(Continued)

FOREIGN PATENT DOCUMENTS
WO 2005060297 A1 6/2005

OTHER PUBLICATIONS

3GPP, ETSI TS 123 236 V5.3.0 (Dec. 2004), Digital Cellular Telecommunications System (Phase 2+); Universal Mobile Telecommunications System (UMTS); Intra-Domain Connection of Radio Access Network (RAN) Nodes to Multiple Core Network (CN) Nodes (3GPP TS 23.236 version 5.3.0 Release 5), 37 pages (2004).

(Continued)

*Primary Examiner* — Kenny Lin
(74) *Attorney, Agent, or Firm* — Hoffmann & Baron, LLP

(57) ABSTRACT

A first group of core network (CN) nodes are arranged for transmitting a change request from a source to a target radio network controller (RNC), to a CN node selected from the set of CN nodes to which the target RNC is connected. Relating to a communication in progress with a first RNC (11) and a first CN node (13), for which a change from the first to a second RNC (12) is requested: the change request is transmitted from the first CN node to a second CN node (14) of the first group, and is forwarded from the second to a third CN node (15) selected, according to predetermined criteria, from the set of CN nodes to which the second RNC is connected.

16 Claims, 4 Drawing Sheets

U.S. PATENT DOCUMENTS

| | | | |
|---|---|---|---|
| 2002/0045451 A1* | 4/2002 | Hwang et al. | 455/442 |
| 2003/0153309 A1* | 8/2003 | Bjelland et al. | 455/432 |
| 2004/0022226 A1 | 2/2004 | Edlund et al. | |
| 2004/0114574 A1* | 6/2004 | Zeira et al. | 370/352 |
| 2005/0213555 A1* | 9/2005 | Eyuboglu et al. | 370/349 |

OTHER PUBLICATIONS

3GPP, ETSI TS 125 413 V5.12.0 (Jun. 2005), Universal Mobile Telecommunications System (UMTS); UTRAN Iu Interface Radio Access Network Application Part (RANAP) Signalling (3GPP TS 25.413 version 5.12.0 Release 5), 254 pages (2005).

3GPP, ETSI TS 129 060 V5.10.0 (Jun. 2004), Digital Cellular Telecommunications System (Phase 2+); Universal Mobile Telecommunications System (UMTS); General Packet Radio Service (GPRS); GPRS Tunnelling Protocol (GTP) Across the Gn and Gp Interface (3GPP TS 29.060 version 5.10.0 Release 5), 96 pages (2004).

International Search Report from PCT/IB/2006/002642, 3 pages (Feb. 12, 2007).

* cited by examiner

METHOD FOR MANAGING COMMUNICATIONS AND RELATED CORE NETWORK NODE

BACKGROUND

The present invention relates to the management of communications in a radiocommunication system.

A radiocommunication system, such as a UMTS ("Universal Mobile Telecommunication System") system for instance, generally includes a core network (ON) part and a radio access network (RAN). Such system can bear circuit switched (CS) communications and/or packet switched (PS) communications.

A core network comprises interconnected nodes called MSCs ("Mobile Switching Centers") for the CS domain and GSN ("GPRS Support Node") for the PS domain. The MSCs which are used as gateways with other networks are called GMSCs ("Gateway MSC"). The GSNs interfaced with a RAN are called SGSNs ("Serving GSNs"), whereas the ones used as gateways towards with networks are called GGSNs ("Gateway GSNs"). The interface between a radio network controller (RNC) of the RAN and a MSC or a SGSN is called Iu interface.

In previous releases of the UMTS standard, a RNC was arranged for cooperating with a respective ON node (a MSO or a SGSN), in a one-to-one relationship. More recently, it has been proposed that a RNC could be connected to several ON nodes belonging to a single CN or different CNs. This is achieved with the mechanism, usually called "Flex" (or "Iu-Flex"), defined in the technical specification 3GPP TS 23.236 version 5.3.0 Release 5, "Digital cellular telecommunications system (Phase 2+); Universal Mobile Telecommunications System (UMTS); Intra-domain connection of Radio Access Network (RAN) nodes to multiple Core Network (ON) nodes", published in December 2004 by the 3GPP ($3^{rd}$ Generation Partnership Project).

In a system where the "Flex" feature is implemented, it is specified that the RNO receiving an attachment request from a mobile terminal, called UE ("User Equipment"), forwards it to one of the ON nodes to which the RNO is connected to, in order to share the load between the ON nodes available.

Similarly, when a change of RNO is requested for a communication in progress with a ON node supporting the "Flex" feature, this CN node is supposed to forward the request to a new CN node selected from a set of CN nodes, called a pool area, to which the target RNC is connected to. The new CN node is selected so that the load is shared between the CN nodes of the pool area.

A problem arises when a RNC change is requested, while not all the CN nodes of the system support the "Flex" feature. Indeed, a CN node not supporting the "Flex" feature is capable of forwarding the request only to one predetermined CN node, even though any other CN node in the pool area could have been targeted instead.

Therefore, the load sharing within the pool area can be effective only by manual configuration (see section 4.5 of the above-mentioned TS 23.236). This means that each CN node not supporting the "Flex" feature should be configured with the identity of a determined target CN node of the pool area, in such a way that a load sharing is statistically obtained within the pool area.

However, such manual configuration is subject to human error and the determination of the target CN node for each source CN node adds engineering complexity.

Moreover, since a source CN node not supporting the "Flex" feature always selects the same target ON node, there is a risk to overload the target CN node when the source CN node has a high load capacity, whereas other CN nodes of the pool area may be available.

Besides, if, for any reason, the single target CN node configured in the source CN node fails, the RNC change cannot be achieved, whereas other CN nodes of the pool area may be operable.

SUMMARY

An object of the present invention is to limit the disadvantages described above.

Another object of the invention is to improve the load sharing and avoid overload at particular core network nodes, when radio network controller changes are requested especially from core network nodes not supporting the "Flex" feature.

Another object of the invention is to simplify the configuration of the core network nodes and to make it more reliable.

Another object of the invention is to allow service continuity even when a particular core network node fails.

Another object of the invention is to allow service continuity and even when high traffic variations occur.

The invention proposes a method for managing communications in a radiocommunication system comprising at least one core network including a plurality of nodes and a radio access network including a plurality of radio network controllers, at least some of the radio network controllers being connected to a respective set of core network nodes, wherein a first group of core network nodes are arranged for transmitting a change request from a source radio network controller to a target radio network controller, relating to a communication in progress, to a core network node selected, according to predetermined criteria, from the set of core network nodes to which the target radio network controller is connected. The method comprises the following steps, relating to a communication in progress with a first radio network controller and a first core network node, for which a change from the first radio network controller to a second radio network controller is requested:

transmitting the radio network controller change request from the first core network node to a determined second core network node of the first group; and forwarding the radio network controller change request from the second core network node to a third core network node selected, according to predetermined criteria, from the set of core network nodes to which the second radio network controller is connected.

Therefore, a traffic distribution can be achieved within the set of core network nodes to which the second radio network controller is connected, although the first core network node always transmits radio network controller change requests to the same determined second core network node.

Such distribution can satisfy any predetermined criteria, such as load balancing within the set of core network nodes to which the second radio network controller is connected.

Advantageously, a second group of core network nodes are arranged for transmitting a change request from a source radio network controller to a target radio network controller, relating to a communication in progress, to only one determined core network node, and the first core network node belongs to this second group of core network nodes. Alternatively, the first core network node could belong to said first group of core network nodes.

Advantageously, the second core network node belongs to the set of core network nodes to which the second radio network controller is connected. In this configuration, the second core network node can itself be selected for serving the communication after the radio network controller change. Alternatively, the second core network node could be dedicated to the traffic distribution towards the set of core network nodes to which the second radio network controller is connected.

According to another aspect of the invention, upon reception from the first radio network controller, the first core network node forwards a radio network controller change cancel request to the second core network or the third core is network, depending on whether the first core network node has already received a response to the radio network controller change request from the third core network node. The radio network controller change cancel request can also be forwarded to the third core network node when received at the second core network. Therefore, the radio network controller change can be properly cancelled, whenever the cancellation request occurs.

The invention also proposes a core network node in a radiocommunication system comprising at least one core network including a plurality of nodes and a radio access network including a plurality of radio network controllers, at least some of the radio network controllers being connected to a respective set of core network nodes. The core network node comprises, in relation with a communication in progress with a first radio network controller and a first core network node and for which a change from the first radio network controller to a second radio network controller is requested:
  means for receiving a radio network controller change request from the first core network node ; and
  means for forwarding the radio network controller change request to a second core network node selected, according to predetermined criteria, from a set of core network nodes to which the second radio network controller is connected.

DESCRIPTION OF PREFERRED EMBODIMENTS

The invention is illustrated here in its application to a UMTS system. It will be appreciated that it can also be applied to other types of radiocommunication systems.

Figure 1:
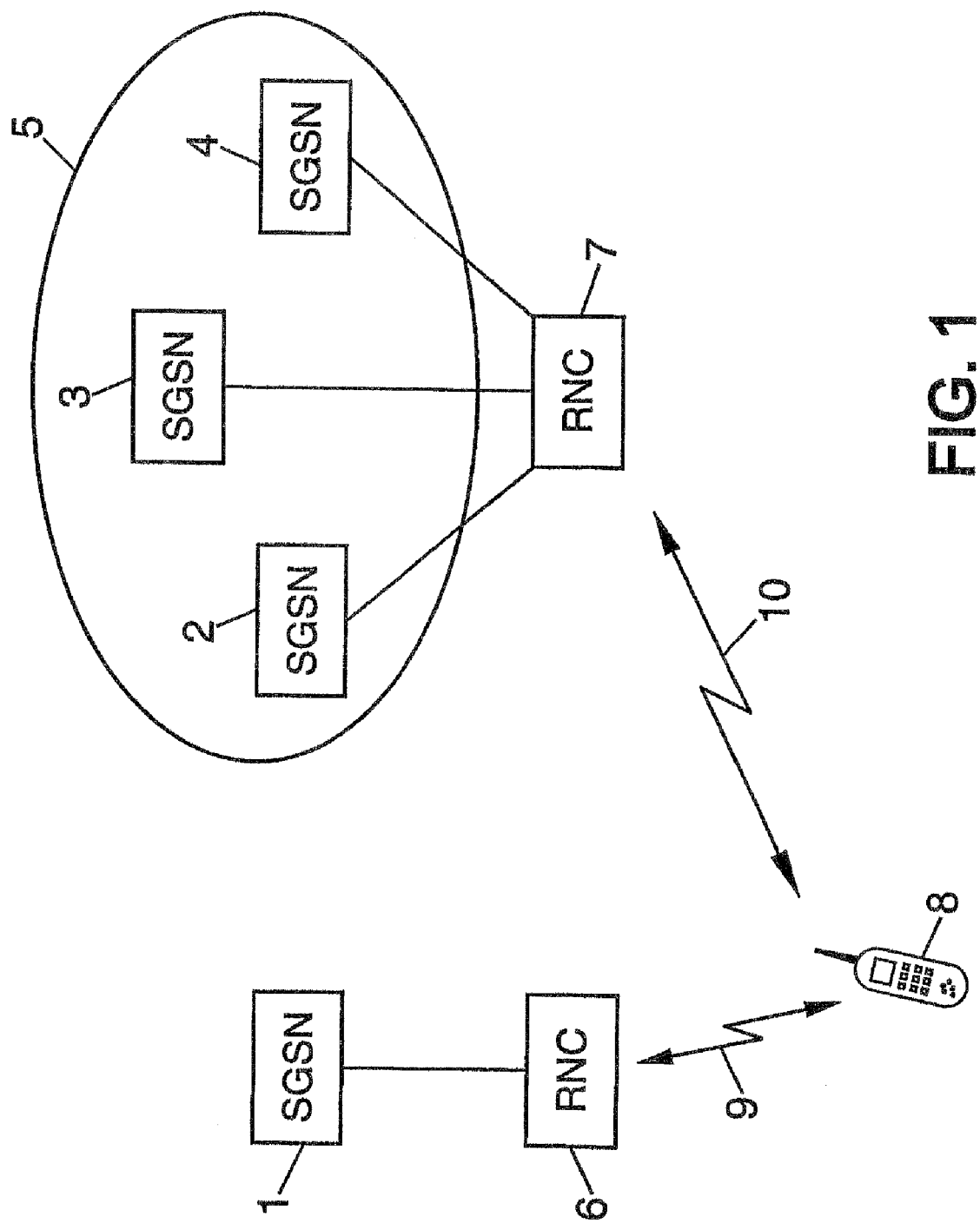
FIG. 1 is a schematic example of a system architecture in which the invention can take place.

FIG. 1 shows a UMTS system comprising a radio access network and a core network. The radio access network includes the RNCs 6 and 7. It also includes base stations, not represented in FIG. 1, which can communicate directly with mobile stations like the UE 8 and which are each connected to a respective RNC.

The core network comprises a plurality of CN nodes. In the illustrated example, all the CN nodes are SGSNs 1-4, i.e. CN nodes used in the PS domain. Of course, it would also be possible to have MSCs for the CS domain instead or in addition to the SGSNs 1-4.

Although it is not represented in FIG. 1, the SGSNs are connected to each other. It is not required that a connection exists between each couple of SGSNs. For instance, a SGSN or even an IP router can be in charge of forwarding the messages exchanged between two SGSNs it is connected to.

In the system of FIG. 1, the RNC 6 is connected to the SGSN 1 only. By contrast, the RNC 7 is connected to the three SGSNs 2-4 by virtue of the "Flex" mechanism. In other words, the SGSNs 2-4 implement the "Flex" mechanism as defined in the above-mentioned TS 23.236, whereas the SGSN 1 does not.

In what follows, it is considered that the UE 8 has a communication in progress with the RNC 6 (through an air interface 9 with a base station under the responsibility of the RNC 6) and the SGSN 1 initially, and that a RNC change is requested. For instance, this RNC change can be requested within the framework of a SRNS relocation procedure as defined in the UMTS standards and well known by one skilled in the art.

Indeed, the SRNS relocation aims at changing the current SRNC ("Serving RNC") of a UE. It is typically used to optimize the information routing within the radio access network, by avoiding the use of DRNCs ("Drift RNCs") and the resulting signaling between the SRNCs and DRNCs. It can also be used in combination with a hard handover procedure when the source cell and the target cell are under the responsibility of different RNCs, or in combination with a cell/URA ("UTRAN Registration Area", where UTRAN designates the "Universal Terrestrial Radio Access Network") update. Of course, the SRNS relocation could also occur in other situations.

In the described example, it is considered that the SRNS relocation results in a SRNC change from the RNC 6 to the RNC 7, relating to the communication involving the UE 8.

Since the SGSN 1 does not implement the "Flex" mechanism, it is only configured with one SGSN to which the SRNC change request should be notified. This SGSN is called the default SGSN in the following.

The default SGSN could preferably be fault tolerant so as to be always available.

Alternatively, the SGSN 1 could be configured with more than one, e.g. two, SGSNs to which the SRNC change request should be notified. In this way, the SRNC change request could be notified to the first configured default SGSN, and then two the second configured default SGSN in the event the first one would not be available.

According to the invention, the default SGSN is arranged for receiving the SRNC change request and to forward it to one SGSN selected from the pool area 5 to which the target RNC 7 is connected, i.e. one of the SGSNs 2-4. This selection is achieved according to predetermined criteria.

Advantageously, the selection of the target SGSN is made by the default SGSN so that a load balancing is achieved within the pool area 5. Thus, the load balancing requirement of above-mentioned TS 23.236 is reached for the SGSNs 2-4 implementing the "Flex" mechanism. The SGSN I does not need to be aware of the loading characteristics of the SGSNs in the pool area 5.

The risk of overload of SGSNs of the pool area 5 is thus limited. Moreover, the configuration of the SGSN 1 is very simple, since only the default SGSN is specified as a recipient for the SRNC change request. The engineering is also simplified because a load balancing is achieved in the pool area 5 whatever the traffic conditions may be. Besides, if one of the SGSNs of the pool area 5 fails, the SRNC change request will be directed to another SGSN by the default SGSN, so that service continuity is ensured with high probability for the communication in progress.

Of course, said predetermined criteria for selecting the target SGSN can comprise other criteria instead or in addition to the load balancing criterion. For example, they can take account of a type of the communication in progress, such as a service carried out with this communication.

In an advantageous aspect of the invention, the default SGSN configured in the source SGSN 1 is one of the SGSNs 2-4 of the pool area 5 to which the target RNC 7 is connected. For example, the default SGSN could be the SGSN 2 of FIG. 1. The SGSN 2 thus forwards the SRNC change request either to another SGSN of the pool area, i.e. the SGSN 3 or 4, or to itself which means that it serves the communication of the UE 8 once it is switched to the RNC 7 via the radio interface 10. In the latter case, there is of course no need of an explicit forward message within the SGSN 2, since the SGSN 2, as a default SGSN, knows that the communication must continue with it. Alternatively, the default SGSN configured in the source SGSN 1 could be out of the pool area 5. For instance, it could be dedicated to the use as a default SGSN.

Figure 2:
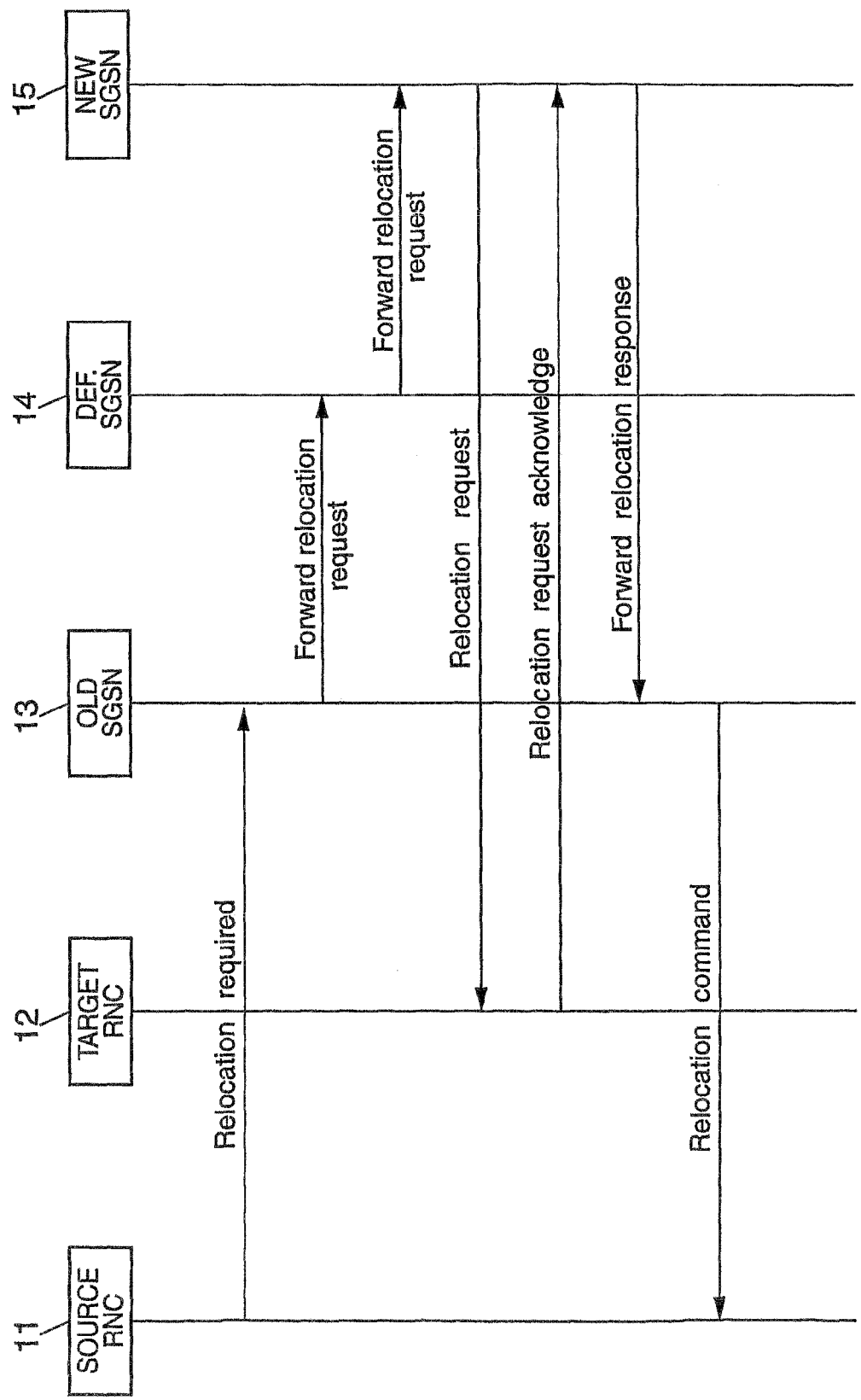
FIG. 2 is an example of possible messages exchanged within the framework of the invention.

FIG. 2 shows an example of messages exchanged according to the invention, during a SRNS relocation procedure. It is considered that, initially, the communication of interest is in progress with the source RNC 11 and the old SGSN 13 not supporting the "Flex" mechanism. As an illustration, in the system of FIG. 1, the communication of the UE 8 would be in progress with the source RNC 6 and the old SGSN 1.

When a decision to perform SRNS relocation has been taken for the communication in progress, the source RNC 11 sends a relocation required message to the old SGSN 13 to inform it that SRNS relocation is to be performed. This message can be as specified in section 9.1.9 of the technical specification 3GPP TS 25.413 version 5.12.0 Release 5, "Universal Mobile Telecommunications System (UMTS); UTRAN Iu interface Radio Access Network Application Part (RANAP) signaling", published in June 2005 by the 3GPP. It includes an identifier of the target for the relocation of SRNS, such as an identifier of the target RNC 12.

On reception of the relocation required message, the old SGSN 13 sends a forward relocation request message to the default SGSN 14 as defined before, to convey necessary information to perform the SRNS Relocation procedure. This message can be as specified in section 7.5.6 of the technical specification 3GPP TS 29.060 version 5.10.0 Release 5, Digital cellular telecommunications system (Phase 2+); Universal Mobile Telecommunications System (UMTS); General Packet Radio Service (GPRS); GPRS Tunnelling Protocol (GTP) across the Gn and Gp interface", published in June 2004 by the 3GPP. In particular, it can include an identifier, like the IMSI ("International Mobile Subscriber Identity"), of the user involved in said communication. It also includes target identification information element containing the identification of the target RNC 12.

The default SGSN 14, as explained above, forwards the received message to a new SGSN 15 which is one of the SGSNs of the pool area to which the target RNC is connected. The selection of the new SGSN 15 by the default 14 is performed according to predetermined criteria, as mentioned before, such as load balancing within the pool area. In case the new SGSN 15 is part of the pool area, for example the SGSN 2 of FIG. 1, the forward relocation request message may be sent to the new SGSN 15 only if it is different from the default SGSN 14, i.e. the SGSN 3 or 4 in the example. Indeed, if the predetermined criteria bring the default 30 SGSN 14 to select itself as the new SGSN 15, this can be achieved without a complete transmission of a message, since the forward relocation request message is already available in the SGSN.

Advantageously, the default SGSN 14 memorizes the selected new SGSN 15 the communication is to be continued with, in association with an identifier of the user involved in said communication identifier, like the IMSI when it is known by the default SGSN 14. As mentioned above, the IMSI can be included in the forward relocation request message received from the old SGSN 13. The association new SGSN-IMSI is memorized for a predetermined duration. For instance, this duration could be T3-response×N3-requests seconds, where, consistently with section 7.6 of the technical specification TS 29.060 version 5.10.0 Release 5, "Digital cellular telecommunications system (Phase 2+); Universal Mobile Telecommunications System (UMTS); General Packet Radio Service (GPRS); GPRS Tunnelling Protocol (GTP) across the Gn and Gp interface", published in June 2004 by the 3GPP, T3-response is a timer which is started when the forward relocation request message is sent by the default SGSN 14 and whose duration is set so that the forward relocation request message has probably been lost if a forward relocation response message has not been received before it expires, and N3-requests is the total number of possible retransmissions for the forward relocation request message. Of course, other memorization duration could also be defined for the new SGSN-IMSI mapping in the default SGSN.

Then, the new SGSN 15 sends a relocation request message to the target RNC 12 identified in the forward relocation request message, to allocate necessary resources for relocation. This message can be as specified in section 9.1.10 of the above-mentioned TS 25.413.

The target RNC 12 returns a relocation request acknowledge message to inform the new SGSN 15 about the result of the resource allocation for the requested relocation. This message can be as specified in section 9.1.11 of the above-mentioned TS 25.413.

The new SGSN 15 also sends a forward relocation response message to the old SGSN 13 as a response to the previous forward relocation request message. This message can be as specified in section 7.5.7 of the above-mentioned TS 29.060. In particular, it can include a SGSN address for control plane. The old SGSN 13 can store this SGSN address and use it when sending control plane messages to the new SGSN 15 in the SRNS relocation procedure.

The old SGSN 13 then sends a relocation command message to the source RNC 11 to inform it that resources for the relocation are allocated in the target RNC 12. This message can be as specified in section 9.1.12 of the above-mentioned TS 25.413.

Other messages can be exchanged afterwards in order to complete the SRNS procedure in a classical way. These messages can be the ones specified in the above-mentioned 3GPP technical specifications. Substitution or additional messages can also be exchanged in case the SRNS relocation procedure is combined with another procedure, such as a hard handover or a cell/URA update as mentioned above and as well known by one skilled in the art.

Once the SRNS relocation is completed, the considered communication can go on with the target RNC 12 and the new SGSN 15 selected by the default SGSN 14. As an illustration, the communication of the UE 8 of FIG. 1 can be served by the target RNC 7 and one of the SGSNs 2-4 of the pool area 5.

Figure 3:
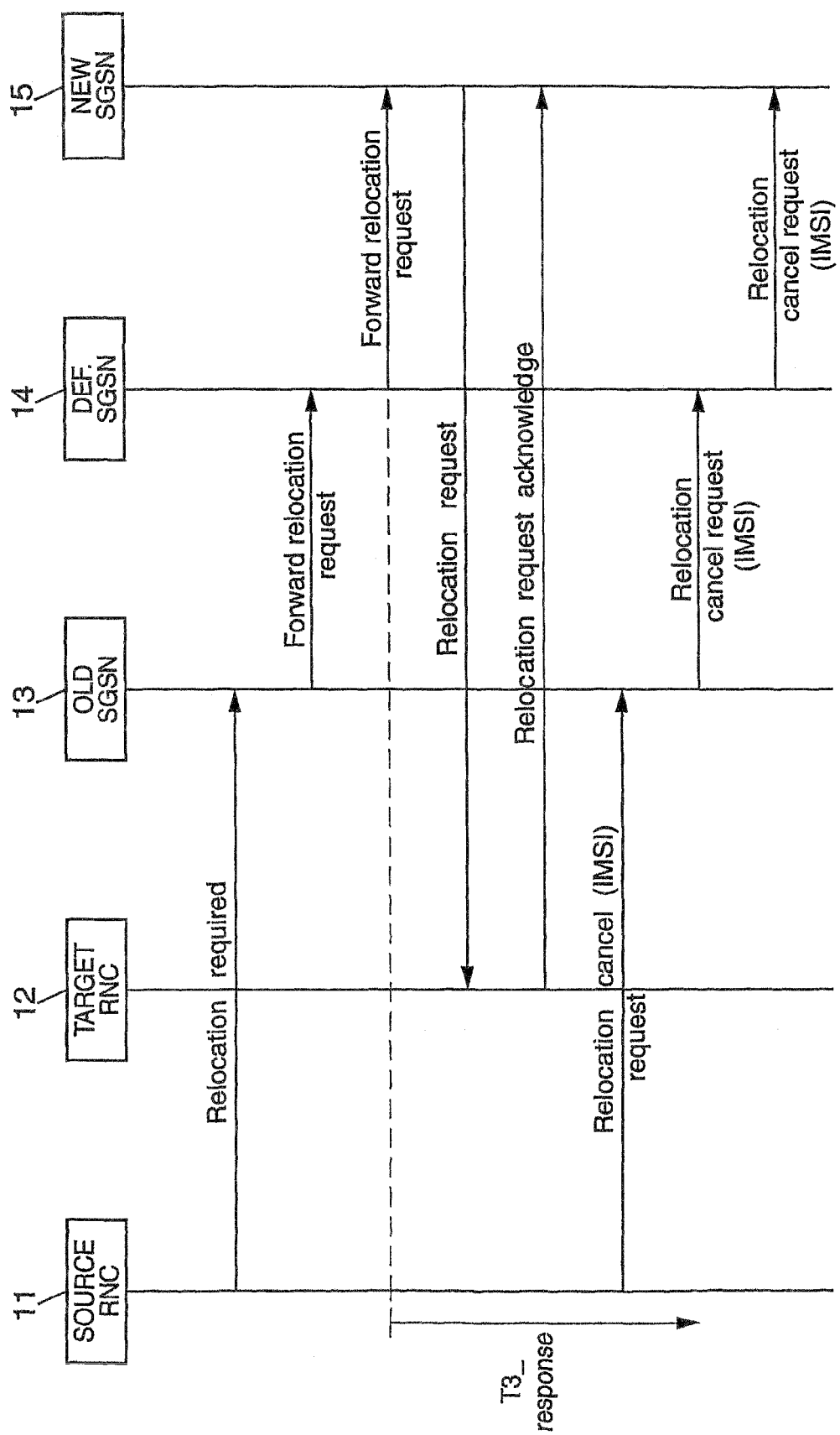
FIGS. 3 and 4 are two different examples of possible messages exchanged when a radio network controller change cancel request occurs.
Figure 4:
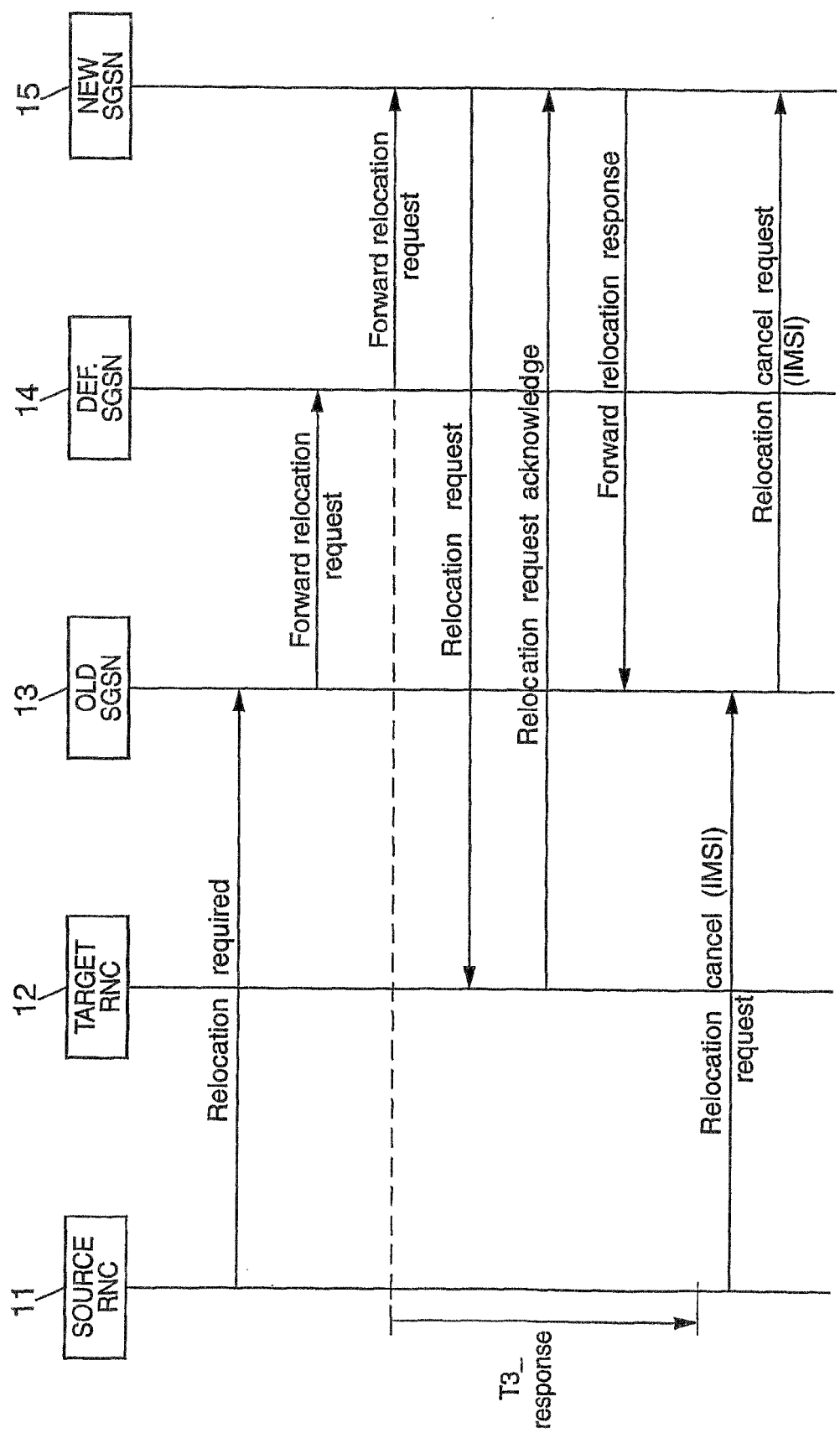

FIG. 3 and FIG. 4 show cases where the SRNS relocation procedure is cancelled. In FIG. 3, the cancellation occurs prior to the transmission of the forward relocation response message from the new SGSN 15 to the old SGSN 13, whereas in FIG. 4, the cancellation occurs after the transmission of the forward relocation response message from the new SGSN 15 to the old SGSN 13. The first messages shown in FIG. 3 and FIG. 4 are identical to the ones of FIG. 2.

The cancellation of the relocation procedure results in the transmission of a relocation cancel request message from the source RNC 11 to the old SGSN 13. This message can be as specified in section 7.5.9 of the above-mentioned TS 29.060. In particular, it can include an identifier of the user involved in the communication in progress, such as his IMSI.

In FIG. 3, since the relocation cancel request message is sent before the reception of the forward relocation response message at the old SGSN 13, the latter does not know that the new SGSN 15 has been appointed to serve the communication. It thus forwards the relocation cancel request message to the default SGSN 14.

In its turn, the default SGSN 14 forwards the relocation cancel request message to the new SGSN 15. This can advantageously be achieved by comparing, at the default SGSN 14, the IMSI included in the relocation cancel request message received from the source RNC 11 with the IMSI included in the forward relocation request message previously sent by the old SGSN 13 provided that the default SGSN 14 has it in its memory, as explained in an advantageous embodiment described above. For example, if the mapping new SGSN-IMSI is memorized by the default SGSN 14 for a duration of T3-response×N3-requests seconds (only T3-response has been represented in FIG. 3, since it is considered that the forward relocation request message has been sent only once to the new SGSN 15), and if the relocation cancel request message is received by the default SGSN 14 before the end of this duration, the default SGSN 14 is in a position to retrieve the relevant IMSI, so that the relocation cancel request message can be forwarded to the correct new SGSN 15.

In FIG. 4, since the relocation cancel request message is sent after the reception of the forward relocation response message at the old SGSN 13, the latter knows that the new SGSN 15 has been appointed to serve the communication. It thus forwards the relocation cancel request message directly to the new SGSN 14, whose address has advantageously been indicated in the forward relocation response message as mentioned above.

Therefore, in any case, the new SGSN 15 can be informed of a potential cancellation of the relocation procedure.

In what precedes, the invention has been described with respect to a communication initially in progress with a SGSN not supporting the "Flex" mechanism. But the invention can also apply to a communication initially in progress with a SGSN supporting the "Flex" mechanism. This latter case is also advantageous, since said SGSN does not need to be always cognizant of the loading of the SGSNs in all adjacent pool areas.

We claim
1. A method for managing communications in a radiocommunication system comprising at least one core network including a plurality of nodes and a radio access network including a plurality of radio network controllers, at least some of the radio network controllers being connected to a respective set of core network nodes, wherein a first group of core network nodes are arranged for transmitting a change request from a source radio network controller to a target radio network controller, relating to a communication in progress, to a core network node selected, according to predetermined criteria, from a set of core network nodes to which the target radio network controller is connected,
   the method comprising the following steps, relating to a communication in progress with a first radio network controller and a first core network node, for which a change from the first radio network controller to a second radio network controller is requested:
   transmitting a radio network controller change request from the first core network node to a determined second core network node of the first group of core network nodes, wherein the first core network node is not part of the first group; and
   forwarding the radio network controller change request from the second core network node to a third core network node selected, according to predetermined criteria, from a set of core network nodes to which the second radio network controller is connected, wherein the first core network node is not aware of the loading characteristics of the third core network node, and wherein the predetermined criteria achieves a load balancing in the set of core network nodes to which the second radio network controller is connected.

2. The method as claimed in claim 1, wherein a second group of core network nodes are arranged for transmitting a change request from a source radio network controller to a target radio network controller, relating to a communication in progress, to only one determined core network node, and wherein said first core network node belongs to the second group of core network nodes.

3. The method as claimed in claim 1, wherein said second core network node belongs to the set of core network nodes to which the second radio network controller is connected.

4. The method as claimed in claim 1, wherein the predetermined criteria according to which the third core network node is selected comprise load sharing within the set of core network nodes to which the second radio network controller is connected.

5. The method as claimed in claim 1, wherein the radio network controller change request transmitted from the first core network node to the second core network node includes an identity relating to the user having a communication in progress.

6. The method as claimed in claim 5, wherein the second core network node memorizes an association between the third core network node and said identity for a predetermined duration.

7. The method as claimed in claim 1, wherein upon reception from the first radio network controller, the first core network node forwards a radio network controller change cancel request to the second core network node or the third core network node, depending on whether the first core network node has already received a response to the radio network controller change request from the third core network node.

8. The method as claimed in claim 7, wherein the radio network controller change cancel request is forwarded to the third core network node when received at the second core network node.

9. The method as claimed in claim 7, wherein the radio network controller change cancel request includes an identity relating to the user having a communication in progress and wherein the second core network node retrieves the third core network node associated with said identity in order to forward the radio network controller change cancel request to it.

10. The method as claimed in claim 1, wherein the second radio network controller can be connected to only one node.

11. A core network node in a radiocommunication system comprising at least one core network including a plurality of nodes and a radio access network including a plurality of radio network controllers, at least some of the radio network controllers being connected to a respective set of core network nodes, said core network node comprising, in relation with a communication in progress with a first radio network controller and a first core network node and for which a change from the first radio network controller to a second radio network controller is requested:

means for receiving a radio network controller change request from the first core network node; and means for forwarding the radio network controller change request to a second core network node selected, according to predetermined criteria, from a set of core network nodes to which the second radio network controller is connected, wherein the first core network node is not aware of the loading characteristics of the second core network node, and wherein the predetermined criteria achieves a load balancing in the set of core network nodes to which the second radio network controller is connected.

12. The core network node as claimed in claim 11, wherein said core network node belongs to the set of core network nodes to which the second radio network controller is connected.

13. The core network node as claimed in claim 11, wherein the predetermined criteria comprise load sharing within the set of core network nodes to which the second radio network controller is connected.

14. The core network node as claimed in claim 11, further comprising means for memorizing, for a predetermined duration, an association between the second core network node and an identity relating to the user having a communication in progress, said identity being included in the radio network controller change request.

15. The core network node as claimed in claim 14, further comprising means for detecting an identity relating to the user having a communication in progress, included in the radio network controller change cancel request, and means for retrieving the second core network node associated with said identity in order to forward the radio network controller change cancel request to it.

16. The core network node as claimed in claim 11, further comprising means for receiving a radio network controller change cancel request from the first core network node and means for forwarding said radio network controller change cancel request to the second core network node.

\* \* \* \* \*